April 7, 1964  J. G. BAERG  3,127,952
MOBILE WORK PLATFORM
Filed Oct. 23, 1961  4 Sheets-Sheet 1

John G. Baerg
INVENTOR.

April 7, 1964  J. G. BAERG  3,127,952
MOBILE WORK PLATFORM
Filed Oct. 23, 1961  4 Sheets-Sheet 3
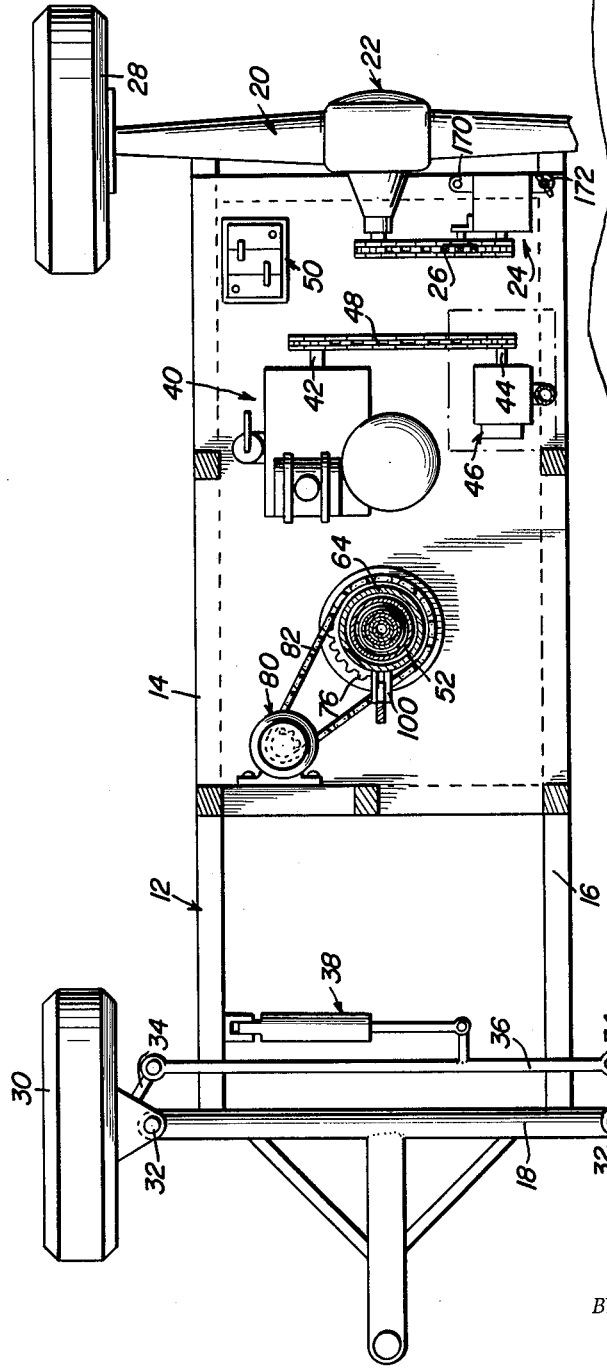
Fig. 3
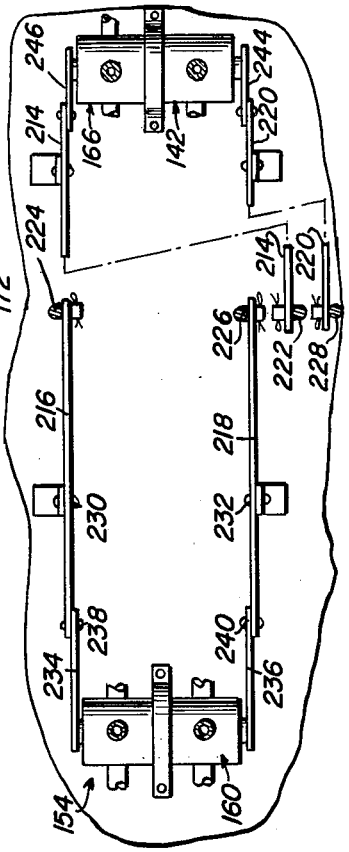
Fig. 7
John G. Baerg
INVENTOR.
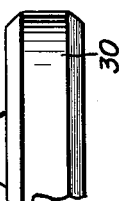

April 7, 1964     J. G. BAERG     3,127,952
MOBILE WORK PLATFORM
Filed Oct. 23, 1961     4 Sheets-Sheet 4
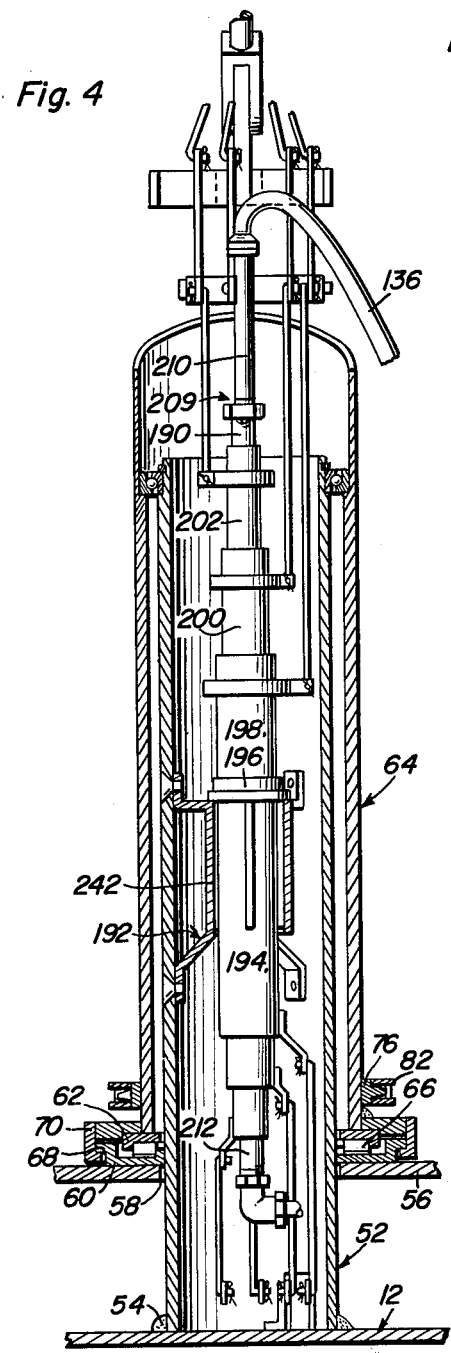
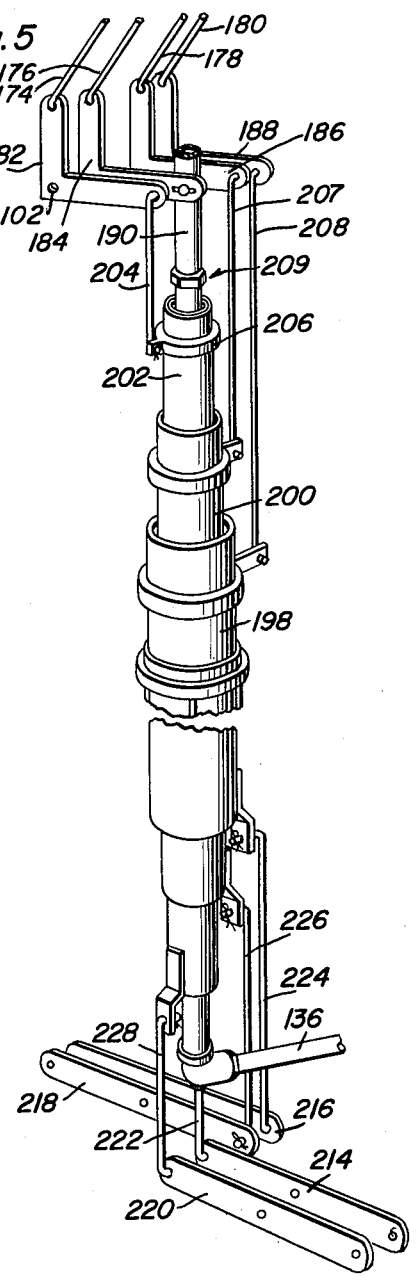
John G. Baerg
INVENTOR.

United States Patent Office 3,127,952
Patented Apr. 7, 1964

3,127,952
MOBILE WORK PLATFORM
John G. Baerg, 10069 Ave. 400, Dinuba, Calif.
Filed Oct. 23, 1961, Ser. No. 147,709
8 Claims. (Cl. 182—2)

The present invention relates to a mobile work platform adapted elevationally to position a worker relative to workpieces, such as trees in orchards and the like, and more particularly, to such a platform utilizing a worker support which is elevationally and revolvably mounted on a mobile frame so as to permit the support effectively to be counterbalanced and to be controlled from the support by mechanical linkages extended between the support and powered positioning means on the frame.

Conventional aerial work platforms of the type employed for tending trees in orchards and the like have been subject to certain difficulties which the present invention has successfully overcome. Such platforms usually provide wheeled main frames on which the worker supports are borne by assemblies pivotally connected to the frames. Hydraulic motors interconnect the support assemblies and the frames for adjusting such members relative to each other. Sources of hydraulic fluid under pressure are provided on the frames and are connected to the motors through control valves borne by the supports. Such systems require the employment of a plurality of unwieldly hoses or other fluid conduits between the sources of hydraulic fluid and control valves and between said valves and the motors. Such hoses or other conduits must be flexible and provide considerable slack to accommodate relative movement of the support assemblies and the frames. Not only have such slack hoses been prone to become entangled with the platforms, tree prunings and the like but such hydraulic connections have precluded full rotation of the worker supports relative to the frames and have thus restricted maneuverability. Although extensive attention has been directed to the avoidance of these difficulties and limitations such efforts have previously been less successful than desired. Efforts to avoid the hoses or other conduits by the substitution of mechanical control linkages have encountered problems which have previously precluded the replacement of the hydraulic systems with mechanical control.

An object of the present invention is, therefore, to provide a mobile work platform incorporating a worker support rotatably mounted on a mobile frame in which the support can be rotated without restriction by control systems or the like.

Another object is to provide a mobile work platform providing a rotationally and elevationally positionable support in which such positioning can be controlled from the support by mechanical means.

Another object is to provide a mobile work platform which includes a worker support pivotally mounted upon a mobile frame for rotational and elevational movement relative to the frame wherein the support is maintained in a substantially horizontal position during such movement.

Another object is to provide a mobile work platform wherein the worker support is pivotally connected to a rotatable mounting sleeve carried on the frame which is readily adapted to mount a counterweight for movement with the mounting sleeve through all rotational positions of the support.

Another object is to provide a mobile work platform incorporating a worker support on which is mounted controls for elevationally and rotatably positioning the support with respect to the frame.

Another object is to provide such a support having power sources mounted on the frame which are selectively controllable from the support.

Another object is to provide such a platform having mechanical linkage interconnecting the support and power sources on the frame wherein such linkage is extended through the mounting sleeve on the frame.

Another object is to provide a mobile work platform providing a worker support pivotally connected to a mounting sleeve and having actuating linkage pivotally mounted on the mounting sleeve at a position concentrically of the pivotal connection between the worker support and the mounting sleeve whereby such linkage is not affected by elevational positioning of the support.

Another object is to provide such a worker support having an actuating linkage interconnecting the support and power sources on the frame wherein a telescopic connection is provided in the linkage to accommodate radial positioning of the support with respect to the frame without affecting the selected position of the linkage.

Another object of the present invention is to provide a mobile work platform which is lightweight, of durable construction, and is easily and safely operated.

Other objects and advantages of the present invention will become more fully apparent in the subsequent description in the specification.

In the drawings:

FIG. 3 is a somewhat enlarged horizontal section of the mobile work platform with parts broken away to illustrate the motors for driving the fluid pump and for driving two of the ground engaging wheels of the main frame of the platform and for rotating the elongated lift beam assembly about a vertical axis.

FIG. 4 is a fragmentary somewhat enlarged vertical section of the support mounting sleeve and tubular frame portion of the mobile work platform.

FIG. 5 is a somewhat enlarged perspective view of portions of the mechanical linkage disposed in the tubular frame portion of the mobile work platform for operatively connecting the controls carried by the worker support to the power sources carried by the main frame of the mobile work platform.

FIG. 6 is a somewhat enlarged fragmentary vertical section taken on line 6—6 of FIG. 2.

FIG. 7 is a somewhat enlarged fragmentary horizontal section taken on line 7—7 of FIG. 2.

FIG. 8 is a diagrammatic view of the hydraulic control system of the mobile work platform.

Figure 1:
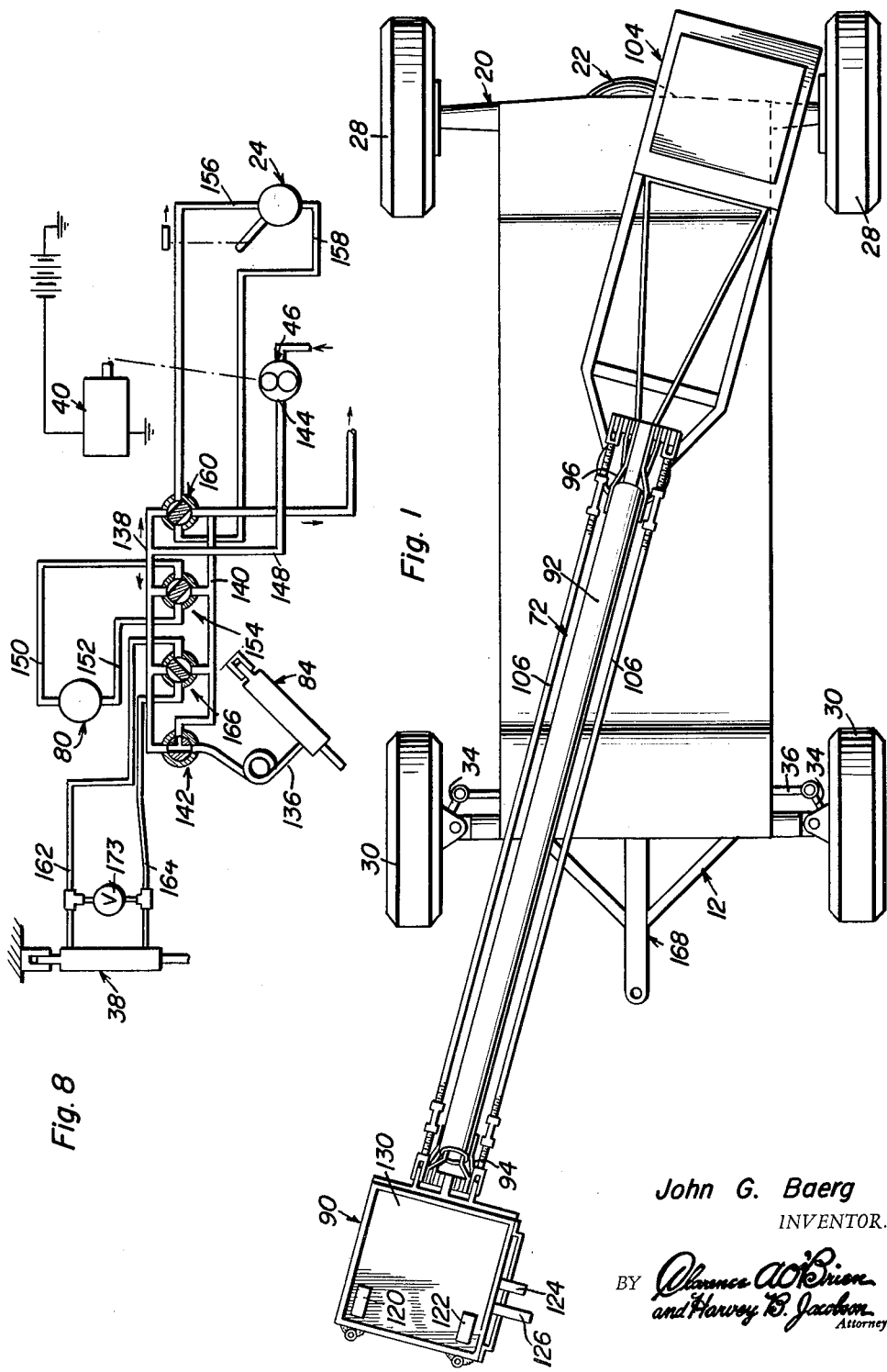
FIG. 1 is a top plan view of the mobile work platform of the instant invention.
Figure 2:
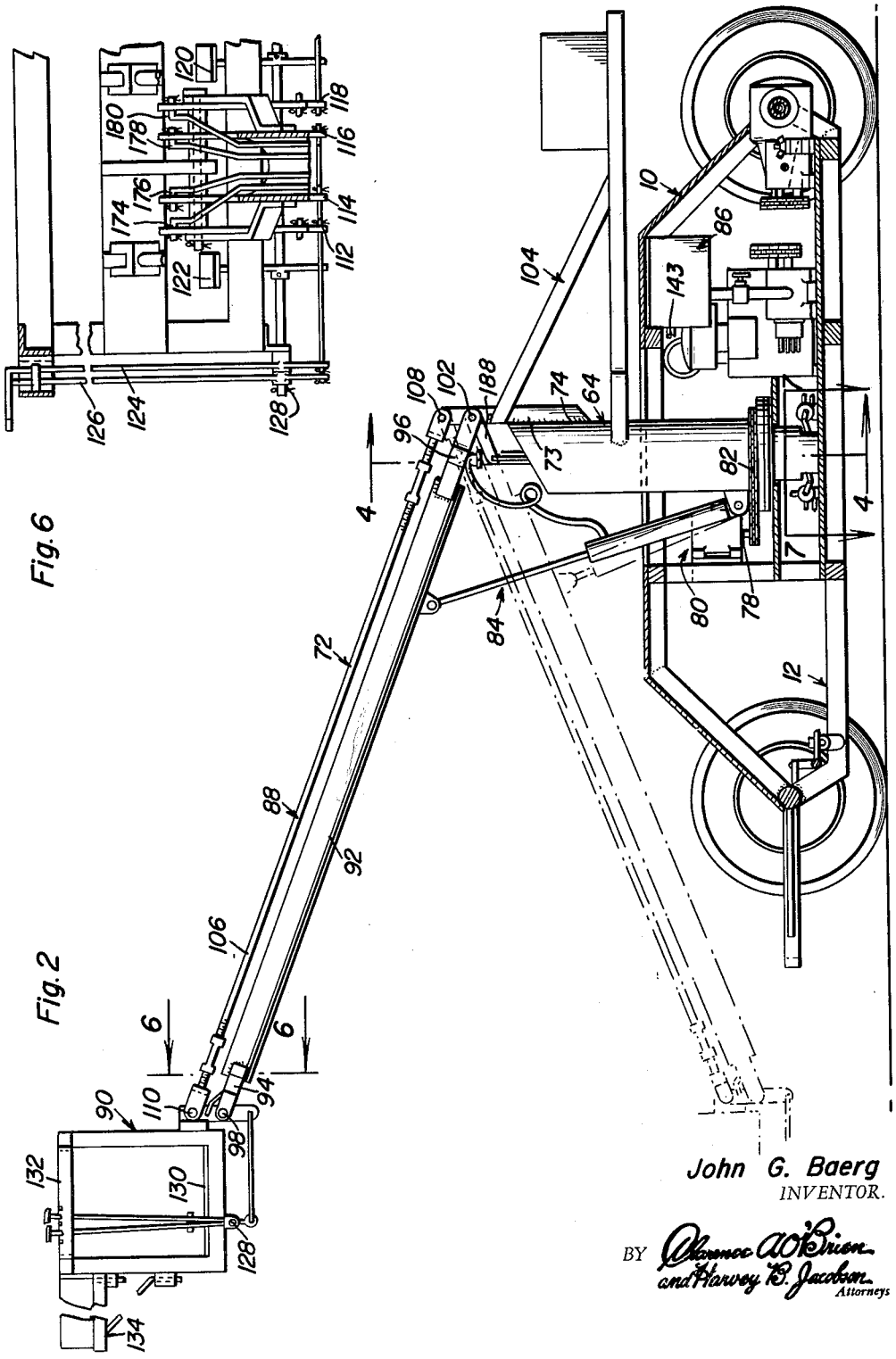
FIG. 2 is a side elevation of the mobile work platform with portions broken away and shown in section and with an alternative position of the elongated lift beam assembly shown in broken lines.

Referring more specifically to the drawings and to FIGS. 1 through 3 in particular, the numeral 10 generally designates the mobile work platform of the instant invention which includes a main frame 12. The main frame includes opposite side longitudinal frame members 14 and 16 and a front transverse frame member 18. A rear axle assembly generally referred to by the reference numeral 20 is secured across the rear ends of the frame members 14 and 16 and includes a differential assembly 22 which is drivingly connected to a suitable reversible fluid motor 24 by means of an endless chain 26. The rear axle 20 includes a pair of drive wheels 28 having driving connection to the differential assembly 22. The transverse frame member 18 has a pair of front steerable wheels 30 pivotally secured to the opposite ends thereof, as at 32, for movement about vertically extending axes.

Each of the wheel assemblies 30 includes a steering arm 34. A tie rod 36 has opposite ends pivotally secured to the free ends of the steering arms 34. An extensible motor 38 is secured between the frame member 14 and the tie rod 36 for steering the front wheel assemblies 30.

The main frame 12 is provided with a prime mover 40 which has an output shaft 42 having driving connection to an input shaft 44 of a fluid pump 46 by means of an endless chain 48. The prime mover 40 may be of any desired type although an internal combustion engine utilizing gasoline as fuel is preferred. A storage battery generally referred to by the reference numeral 50 is provided for supplying a source of electrical potential for starting the prime mover 40 and supplying electrical potential for an ignition system operationally associated therewith.

With attention now invited to FIGURES 2 and 4 of the drawings it will be noted that the main frame 12 includes an upright tubular portion 52 having a lower end rigidly secured to the main frame 12 in any convenient manner, such as by welding at 54. A horizontally disposed bracing member 56 of the main frame 12 is apertured as at 58 through which the tubular portion of the frame 52 is upwardly extended. The horizontal bracing member 56 has rigidly secured thereto an annular bearing race 60. An annular bracing race 62 is carried by the lower end of an upstanding mounting sleeve 64 telescoped over the tubular mounting member 52. A plurality of roller bearings 66 are disposed between the confronting faces of the races 60 and 62. The bearing race 60 also includes an outer annular retaining flange 68 with which a retaining flange 70 carried by the lower end of the mounting sleeve 64 interlockingly engages for rotation relative thereto.

An elongated lift beam assembly generally referred to by the reference numeral 72 is pivotally connected to the upper end of the mounting sleeve 64 by an extension bar 73 fixedly secured to the sleeve in any convenient manner such as by welding at 74. The mounting sleeve 64 also includes a sprocket ring gear 76 which is connected to an output shaft 78 of a fluid motor 80 by means of an endless chain 82. An extensible fluid motor 84 is pivotally secured at opposite ends to the base of the sleeve and the elongated lift beam assembly 72 for effecting pivotal movement of the lift beam assembly about a horizontal axis. The fluid motors 24, 38, 46, 80 and 84 are each operatively connected to a fluid reservoir 86 by a system of conduits described in greater detail later in the description.

The lift beam assembly 72 includes a parallelogram linkage generally referred to by the reference numeral 88 having an outer free end on which is mounted a worker support 90. The parallelogram linkage 88 includes a main tubular beam 92 having opposite bifurcated end mounts 94 and 96 which are individually pivotally connected to the worker support 90 as at 98 and the extension bar 73 as at 102. The weight of the lift beam assembly 72 is counterbalanced by means of a counterweight 104 which extends from the side of the sleeve member 64 at a position substantially diametrically opposed to the lift beam assembly 72. With this arrangement the worker support is effectively counterbalanced in any radial position during rotation relative to the main frame 12.

The parallelogram linkage 88 also includes a pair of adjustable tie rods 106 having opposite ends pivotally secured to the extension bar 73 as at 108 and the worker support 90 as at 110. Thus, it will be noted that the worker support is constantly maintained in an upright position throughout pivoting movement of the lift beam assembly 72 about a horizontal axis by means of the parallelogram linkage 88. A plurality of levers 112, 114, 116 and 118 are pivotally secured at their mid-portions to the worker support 90 about the axis of rotation defined by the pivotal connection 98 and have their lower ends operatively connected to control pedals 120 and 122 and control levers 124 and 126 by means of suitable linkage. The control pedals 120 and 122 and the control levers 124 and 126 are each pivotally secured to the worker support for movement about a horizontal axis, as at 128.

The worker support 90 includes a floor 130 and an elevated rail assembly 132 together with a produce receiving basket 134 or the like for receiving fruit which has been picked from a tree.

The extensible motor 84 includes a single inlet line 136, as shown in FIGURE 8, which is connected to a fluid pressure manifold line 138 and a return manifold line 140 by means of a valve 142. The return line 140 is connected to an inlet conduit 143 of the fluid reservoir 86 and the fluid pressure manifold line 138 is communicated with an outlet conduit 144 of the pump 46 by means of a main feeder line 148. The control valve 142 may be actuated to communicate the fluid pressure manifold line 138 with the inlet line 136 or to communicate the latter with the return line 140. In addition, the control valve 142 may be actuated to also terminate communication of the line 136 with both of the lines 138 and 140.

The fluid motor 80 includes a pair of fluid lines 150 and 152 which may be selectively and reversibly communicated with the fluid pressure manifold line 138 and the return line 140 by means of a control valve 154. Additionally, the control valve 154 may also be actuated to maintain both of the lines 150 and 152 out of communication with the lines 138 and 140. The fluid motor 24 is provided with a pair of fluid lines 156 and 158 which may also be selectively and reversibly communicated with the lines 138 and 140 by means of a control valve 160 which is substantially identical to the control valve 154. The extensible motor 38 also includes a pair of fluid lines 162 and 164 which may be selectively and reversibly communicated with the lines 138 and 140 by means of a control valve 166. The prime mover 40 as previously set forth therefore provides a source of power for each of the fluid motors 24, 38, 80 and 84 by means of the pump 46.

The main frame 12 is provided with a towing tongue 168 which may be utilized to tow the mobile work platform 10 behind a draft vehicle. If the tongue is employed for such purpose, the differential assembly 22 is disconnected from the fluid motor 24 and the extensible fluid motor 38 is rendered inoperative in order that the wheel assemblies 30 may pivot freely in response to turning movement of the draft vehicle. Accordingly, the fluid motor 24 is pivotally secured to the main frame 12 as at 170 and may be secured in operating position by means of a fastener 172. When it is desired to tow the mobile work platform 10, the fastener 172 is loosened and the fluid motor 24 is pivoted to remove the endless chain 26. The extensible fluid motor 38 is provided with a by-pass valve 173 which is actuated to provide unrestricted communication between the lines 162 and 164. In this manner, the wheel assemblies 30 are free to pivot in response to turning movement of the draft vehicle behind which the mobile work platform 10 is being towed.

With attention now invited to FIGS. 4 through 6 of the drawings it will be noted that each of the levers 112, 114, 116 and 118 has a connecting link pivotally secured thereto. The connecting links 174, 176, 178 and 180 operatively connect the levers 112, 114, 116 and 118 respectively to the bell cranks 182, 184, 186 and 188 respectively which are each pivotally secured in coaxial relation with the beam mounts 94 and 96 to the extension bar 73 at 102. The bell cranks thereby compensate for the movement of the lift beam assembly 72 during elevational positioning of the worker support to insure that such movement is not transmitted to the links. The connecting links extend through the tubular beam 92 of the lift beam assembly. The bell crank 184 is secured to an innermost elongated upstanding hollow connecting member 190.

The upright tubular portion 52 of the frame 12 has a supporting web 192 fixedly secured therein to slidably mount an outer tubular connecting member 194. A stop collar 196 is carried by the outer tubular member to limit its sliding movement within the web. A longer tubular connecting member 198 is telescopingly reciprocably disposed within the outer tubular member 194. A tubular connecting member 200 is in turn telescopingly reciprocably disposed within the tubular member 198 and is longer than the former. A still longer tubular member 202 is telescopingly reciprocably disposed within the connecting member 200. The hollow inner connecting member 190 is telescopingly reciprocably disposed within the tubular member 202. It will be noted that the opposite ends of the tubular member 200 extend beyond the opposite ends of the tubular member 198 and that the opposite ends of the tubular members 202 and 190 extend beyond the opposite ends of the tubular members 200 and 202 respectively. The bell crank 182 is operatively connected to the tubular member 202 by means of a connecting link 204 and the lower end of the connecting link 204 is secured to a collar 206 which is rotatably journaled on the tubular member 202 and provided with any convenient means for preventing longitudinal displacement of the collar 206 relative to the tubular member 202. The bell cranks 186 and 188 are similarly connected to the tubular members 200 and 198 by a pair of links 207 and 208 respectively. The hollow inner member 190 is disposed within the fluid line 136 and includes a swivel connection 209 for enabling rotation of an upper portion 210 of the inner member relative to a lower portion 212 thereof. The lower end 212 of the inner member is connected with the control valve 142 and the upper portion 210 thereof is communicated with the fluid motor 84.

The connecting members 190, 198, 200 and 202 are individually connected to a plurality of corresponding actuating levers 214, 216, 218 and 220 respectively by means of connecting links 222, 224, 226 and 228 respectively. The links 214, 216, 218 and 220 are in turn individually connected to the control valves 142, 154, 160 and 166 respectively.

With attention now directed to FIGURE 7 of the drawings it will be noted that the levers 216 and 218 are pivotally secured at their mid-portions to the main frame 12 as at 230 and 232 respectively. The opposite ends of the levers 216 and 218 remote from the connecting links 224 and 226 are individual pivotally secured to a pair of actuating arms 234 and 236 of the control valves 154 and 160 respectively at 238 and 240. Thus, upon actuation of the levers 116 and 118, the rotation of the lift beam assembly 72 about its vertical axis of rotation and the forward and reverse movement of the wheeled main frame 12 may be controlled. The levers 214 and 220 are similarly operatively connected to the control valves 142 and 166 through a pair of connecting links 244 and 246 for pivoting the lift beam assembly 72 about a horizontally disposed axis and steering of the wheel assemblies 30.

It will be noted that a splined connection 242 is provided between the web 192 and the outer tubular connecting member 194 whereby rotation of the latter about its longitudinal axis will be prevented. Additionally, similar splined connections, not shown, are provided on each of the mating surfaces between the connecting members 190, 202, 200, 198 and 194.

Thus it may be seen that the mobile work platform or worker support is provided with a plurality of fluid motors which are selectively actuated for pivoting the lift beam assembly 72 about horizontally and vertically disposed axes, for driving the rear wheels 28 and steering the front wheel assemblies 30. The fluid motors are carried by the main frame 12 with interconnecting mechanical linkages extending between the control valves 140, 142, 160 and 166 and the worker support 90. The mechanical linkages are extended through the tubular portion 52 of the main frame 12 wherein the telescopic connecting members 190, 194, 198, 200 and 202 permit the worker support 90 to be fully revolvable about the frame without disturbing the selected positions of the control linkages. Similarly, with the linkage levers 182, 184, 186 and 188 pivoted concentrically about the pivotal connections 98 and 102 of the parallelogram linkage 88 the control linkage is not affected by the raising and lowering of the worker support. In this manner, complicated pivotal connections including conduit means for fluid under pressure are maintained at a minimum and the chances of malfunctioning of the mobile work platform are greatly reduced.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A mobile work platform comprising a frame having a tubular portion extended therefrom in axially erect position, a sleeve rotatably mounted on said tubular portion, a parallelogram lift beam assembly pivotally mounted on the sleeve and radially extended therefrom for elevational adjustment, a worker support pivotally mounted on the extended beam assembly, power means borne by the frame, and control linkage interconnecting the power means on the frame and the worker support, said control means including actuating means in the support, a first bell crank pivotally mounted concentrically of the pivotal connection of the support to the beam assembly having controlled connection to the actuating means, a second bell crank pivotally mounted concentrically of the pivotal connection of the beam assembly to the sleeve and radially extended in fixed radial relation from the sleeve, a push-pull linkage interconnecting said bell cranks, a control lever having controlling connection to the power means mounted in the frame for pivotal elevational movement and disposed in fixed radial relation to the tubular portion, a connecting member mounted concentrically within the tubular portion of the frame for axial movement with respect thereto, a lower link interconnecting the connecting member and the control lever, and an upper link interconnecting the second bell crank and the connecting member, one of said links being connected to the connecting member for relative rotational movement thereabout and in fixed axial relation thereto.

2. An aerial work platform, for supporting workmen in an elevated position and properly orientating them relative to a workpiece such as a tree, said platform comprising a main frame having an upright tubular mounting member rigidly secured thereto and projecting upwardly therefrom; a sleeve member disposed in circumscribing relation about said tubular mounting member; means journaling said sleeve on said tubular mounting member for rotation relative to the main frame about an upstanding axis; an elongated support beam assembly carried by said sleeve member having an end portion pivotally secured to the sleeve member for movement about a generally horizontally disposed axis and an opposite end portion outwardly extended therefrom; a worker support pivotally mounted on said opposite outer end of the support beam assembly; first motor means mounted on the main frame having driving connection to said sleeve member for rotational positioning of the latter; control means mounted on the main frame having controlling connection to said first motor means; actuating means including a control carried by said support beam assembly and having rotatable connection with said main frame for actuating said first motor means, said actuating means also including an elongated connecting member concentrically disposed in said tubular mounting member for reciprocating longitudinal movement therein, lower motion transmitting means operatively connecting the lower end of said connecting member with said control means, and upper motion transmitting means operatively connecting the upper end of said connecting member with said control, one of said motion transmitting means having rotatable connection to the connecting member to permit relative rotary movement between said motion transmitting means; second motor means operatively connected between said support beam assembly and the sleeve for pivoting said support beam assembly relative to said sleeve; second control means carried by said main frame; second actuating means including a second control carried by said support beam assembly including a rotatable connection with said main frame for actuating said second control means; a plurality of wheels mounted in supporting relation on the main frame; third motor means drivingly connected to at least one of said supporting wheels; third control means for said third motor means carried by said main frame; third actuating means including a third control carried by said support beam assembly including a rotatable connection with said main frame for actuating said third control means, wherein at least one of said supporting wheels is steerable; fourth motor means having driving connection to said steerable wheel for steering the same; fourth control means for said fourth motor means including a fourth control carried by said main frame; fourth actuating means carried by said support beam assembly including a rotatable connection with said main frame for actuating said fourth control means; each of said second, third, and fourth actuating means also including respective vertically disposed and elongated tubular connecting members disposed in said tubular mounting member, said tubular connecting members being telescoped with the innermost disposed about the first-mentioned connecting member, the innermost of said connecting members being the longer with each successive outer connecting member being shorter in length, said second, third and fourth actuating means also each including independent lower motion transmitting means operatively connecting the lower end of its corresponding tubular connecting member to the associated control means and independent upper motion transmitting means operatively connecting the upper ends of its corresponding tubular connecting member to its respective control, one of said motion transmitting means of each actuating means being rotatably connected to its respective connecting member to provide relative rotational movement between the motion transmitting means of each connecting member.

3. The apparatus of claim 2 wherein said upright tubular mounting member includes guide means engaged with the outermost of said tubular connecting members and mounting the latter for longitudinal reciprocating movement.

4. The combination of claim 3 wherein the innermost of said connecting members is also tubular and comprises a fluid conduit.

5. A work platform adapted elevationally to position workmen relative to workpieces comprising a main frame having a tubular portion extended upwardly therefrom in axially erect position, a sleeve rotatably journaled in circumscribing relation about said tubular portion of the main frame, a worker support, means pivotally mounting said worker support on the sleeve for swinging the worker support in substantially vertical planar relation thereto, first power means borne by the main frame having positioning connection to said sleeve adapted to rotate the sleeve on the tubular portion of the frame through 360° with respect thereto, second power means borne by the sleeve having positioning connection to said worker support mounting means, and a pair of mechanical control linkages individually extended from said first and second power means through said tubular portion of the main frame to the worker support and at the worker support providing actuating means for controlling the elevational and rotational positioning of the worker support relative to the frame, each of said linkages including a tubular connecting member disposed concentrically within the tubular portion of the main frame for axial movement with respect thereto having a lower link assembly connected to its respective power means in fixed radial relation to said tubular portion and an upper link assembly connected to its respective power means in fixed radial relation to said tubular portion and an upper link assembly connected to its respective manipulating means in fixed radial relation to the sleeve, one of said link assemblies of each linkage being rotatably connected on its respective tubular connecting member in fixed axial relation thereto.

6. A mobile work platform adapted for movement upon a support surface and elevationally to position workmen relative to workpieces comprising a main frame having a tubular portion extended upwardly therefrom in axially erect position, said frame providing a plurality of wheels in contact with such support surface with at least one of said wheels being steerable, a sleeve rotatably journaled in circumscribing relation about said tubular support portion of the main frame, a worker support, means pivotally mounting said worker support on the sleeve for swinging the worker support in substantially vertical planar relation thereto, first power means borne by the main frame having rotational positioning connection to said sleeve, second power means borne by the sleeve having elevational positioning connection to said worker support mounting means, third power means borne by the main frame having driving connection to said wheels of the main frame, fourth power means borne by the main frame having positioning connection to said steerable wheel, and mechanical control linkages individual to the several power means extended from their respective power means through said tubular portion of the frame to the worker support and at the worker support providing actuating means for controlling the elevational and rotational positioning of the worker support relative to the frame, for controlling the earth traversing movement of the frame and for steering the steerable wheel, each of said control linkages including an independent connecting member disposed concentrically within the tubular portion of the main frame for axial movement with respect thereto having a lower link assembly connected to its respective power means including a control lever in fixed radial relation to said tubular portion and mounted on the frame for pivotal elevational movement, an upper link assembly connected to its respective manipulating means including a crank in fixed radial relation to the sleeve and mounted thereon for pivotal elevational movement, one of said link assemblies of each linkage being rotatably connected to its respective tubular connecting member in fixed axial relation thereto.

7. A motion absorbing coupling adapted to transmit linear control movement while absorbing rotational movement comprising a tubular member having a longitudinal axis, a sleeve journaled in circumscribing relation on the tubular member for rotation about said axis, a plurality of controlling means borne by the sleeve in fixed radial relation thereto adjacent to an end thereof, a plurality of controlled means mounted in fixed radial relation to the tubular member adjacent to the end thereof opposite to the controlling means, a plurality of control systems individually interconnecting respective controlled and controlling means and extended through said sleeve and tubular member, said systems each including a cylindrical connecting member, said connecting members being nested concentrically within the tubular member in longitudinally slidable, non-rotatable relation to each other, the relatively inward connecting members having opposite ends endwardly extended from their respective relatively outward connecting members, links individually interconnecting the controlling means with the adjacent ends of their respective connecting members, and links individually interconnecting the controlled means with the adjacent ends of their respective connecting members, one of the links of each connecting member being connected thereto for relative rotational movement in fixed axial relation thereto.

8. A mobile work platform adapted for movement upon a support surface elevationally to position workmen relative to workpieces comprising a main frame having a tubular portion extended upwardly therefrom in axially erect position, said frame providing a plurality of wheels in contact with such support surface with at least one of said wheels being steerable, a sleeve rotatably journaled in circumscribing relation about said tubular support portion of the main frame, a worker support, means pivotally mounting said worker support on the sleeve for swinging the worker support in substantially vertical planar relation thereto, first power means borne by the main frame having rotational positioning connection to said sleeve, second power means borne by the sleeve having elevational positioning connection to said worker support mounting means, third power means borne by the main frame having driving connection to said wheels of the main frame, fourth power means borne by the main frame having positioning connection to said steerable wheel, and mechanical control linkages individual to the several power means extended from their respective power means through said tubular portion of the frame to the worker support and at the worker support providing actuating means for controlling the elevational and rotational positioning of the worker support relative to the frame, for controlling the earth traversing movement of the frame and for steering the steerable wheel, each of said control linkages including an independent tubular connecting member disposed concentrically within the tubular portion of the main frame for axial movement with respect thereto having a lower link assembly connected to its respective power means including a control lever in fixed radial relation to said tubular portion and mounted on the frame for pivotal elevational movement, an upper link assembly connected to its respective manipulating means including a crank in fixed radial relation to the sleeve and mounted thereon for pivotal elevational movement, one of said link assemblies of each linkage being rotatably mounted on its respective tubular connecting member in fixed axial relation thereto, the tubular connecting members being concentrically nested, independently axially movable and the relatively inner tubular connecting members having opposite ends endwardly extended from their respective relatively outer connecting members, the links being connected to the ends of their respective tubular connecting members where extended from the relatively outer connecting members.

References Cited in the file of this patent
UNITED STATES PATENTS

| | | |
|---|---|---|
| 1,008,338 | Holt | Nov. 14, 1911 |
| 2,627,560 | Eitel | Feb. 3, 1953 |
| 2,777,737 | Balogh | Jan. 15, 1957 |
| 2,954,092 | Trump | Sept. 27, 1960 |
| 2,970,667 | Bercaw | Feb. 7, 1961 |
| 2,998,861 | Hotchkiss | Sept. 5, 1961 |